(Model.)
J. BARTLETT.
SEED DRILL.
No. 251,160. Patented Dec. 20, 1881.
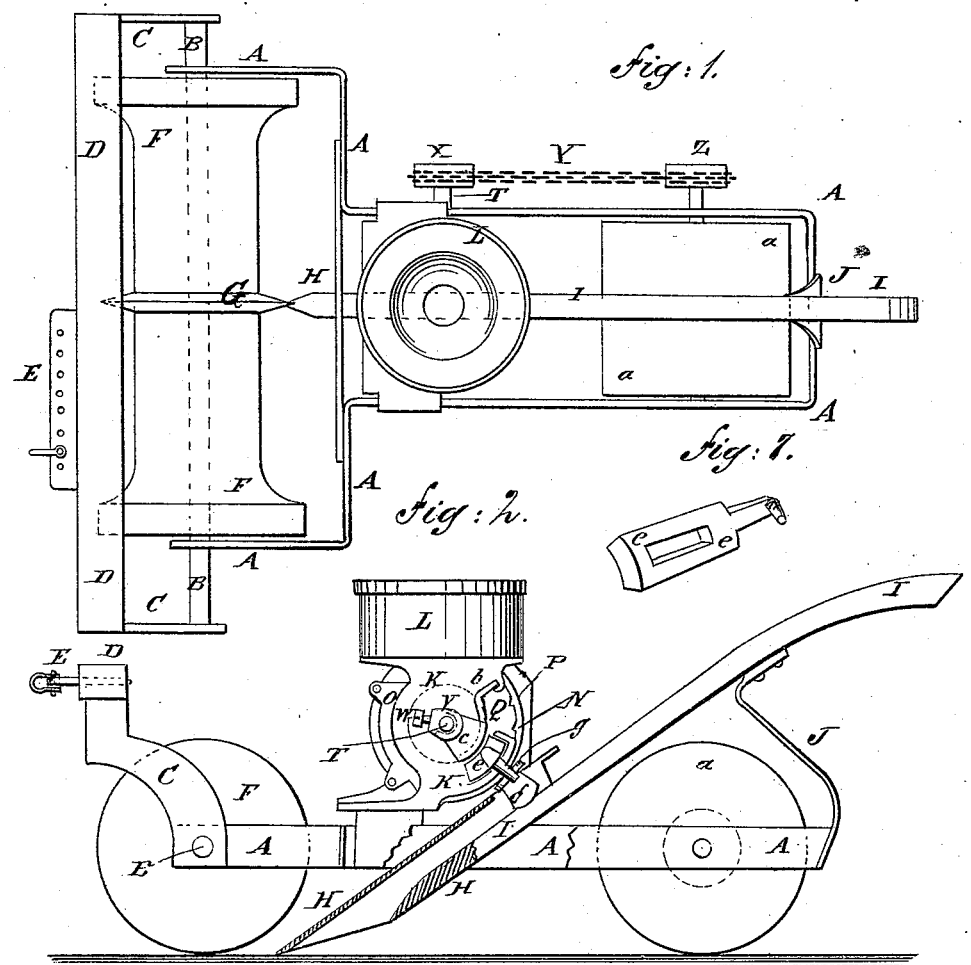
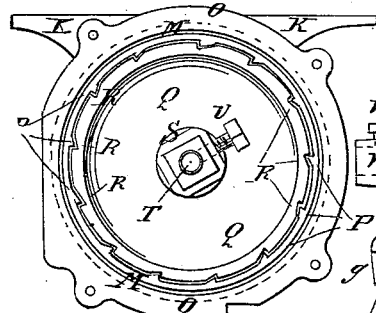
WITNESSES:
Chas. Nida
C. Sedgwick
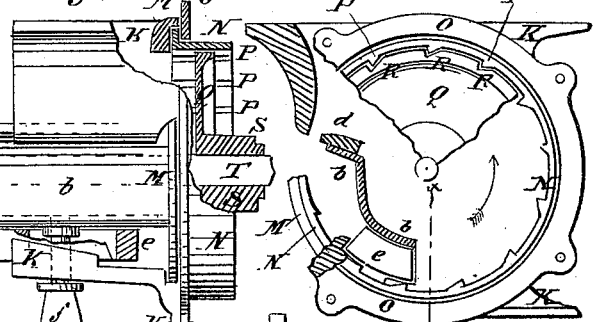
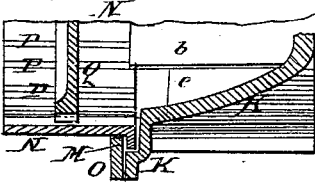
INVENTOR:
J. Bartlett
BY Munn & Co
ATTORNEYS.

UNITED STATES PATENT OFFICE.

JOHN BARTLETT, OF OSHAWA, ONTARIO, CANADA.

SEED-DRILL.

SPECIFICATION forming part of Letters Patent No. 251,160, dated December 20, 1881.

Application filed April 23, 1881. (Model.)

*To all whom it may concern:*

Be it known that I, JOHN BARTLETT, of Oshawa, in the Province of Ontario and Dominion of Canada, have invented a new Improvement in Grain and Seed Drills, of which the following is a full, clear, and exact description.

Figure 1 is a plan view of my improvement. Fig. 2 is a side elevation of the same, partly in section. Fig. 3 is a side elevation of the seed-distributing apparatus. Fig. 4 is a rear elevation of the same, partly in section. Fig. 5 is a side elevation of the distributing apparatus, parts being broken away and the gages being shown in section. Fig. 6 is a sectional elevation of the lower part of the said distributing apparatus, taken through the line $x$ $x$, Fig. 5.

The object of this invention is to facilitate the planting of grain and seeds in drills and promote the convenience of the farmer by enabling him to plant different kinds of grain and seeds with the same distributing apparatus.

A represents the frame of the drill, the forward part of which is made wide and its rear part narrow, as shown in Fig. 1.

B is a shaft, which is made longer than the width of the forward part of the frame A, and slides in bearings in the forward ends of the side bars of the said frame.

To the ends of the shaft B are attached arms C, which are connected by a cross-bar, D.

To the cross-bar D is attached the draw-bar E, which has a number of holes formed through it to receive the draft-clevis or other coupling, so that the point of draft attachment can be adjusted as required.

Upon the shaft B, between the forward ends of the side bars of the frame A, is placed the forward roller, F, the face of which is concaved, and has a V-shaped ring-flange, G, formed around or attached to its center, to serve as a cutter to cut off any roots or vines that might impede the drill-foot H. The shank of the drill-foot H is made hollow, and has an opening in its upper side to adapt it to serve as a spout to receive the seed and conduct it to the bottom of the channel opened by the said drill-foot. The drill-foot H is rigidly connected with the frame A, and to it is attached a handle, I, which projects back into such a position that it can be readily reached and operated by the driver. The rear part of the handle I is supported by a brace, J, the upper end of which is attached to the said handle, and its lower end is attached to the rear cross-bar of the frame A.

To the forward end of the narrow rear part of the frame A, or to a platform attached to the said frame, is secured the seed-cup K, to the top of which is attached the seed box or hopper L. In one side of the seed-cup K is formed a circular aperture, which is countersunk or rabbeted to receive the flange M, formed around the inner edge of the rim of the distributing-wheel N. The distributing-wheel N is kept in place by a retaining-ring, O, which surrounds the wheel N, rests against the flange M, and is bolted to the side of the seed-cup K, so as to swivel the said distributing-wheel to the said seed-cup.

Upon the inner surface of the wheel N are formed ribs P, which, as the said cylinder revolves, act as buckets to carry the seed to the discharge-opening.

Q is a disk, which is made of such a size as to fit into the interior of the wheel N, and has notches R upon its edge to receive and fit upon the ribs or buckets P of the said wheel N, so that the wheel N will be carried around by and with the disk Q in its revolution. The hub S of the disk Q fits upon the shaft T, and is secured to it by a set-screw, U, which passes in through the said hub S and rests against the said shaft T. The shaft T revolves in bearings in the side of the seed-cup K, and has a collar, V, secured to its other end by a set-screw, W, to retain the said shaft in place. The outer end of the hub of the disk Q is squared to fit into a square recess in the hub of the chain-pulley X, which may be secured to the said shaft T by a set-screw by slightly upsetting the said shaft, or by other suitable means.

If desired, the disk Q and the pulley X can be secured to the shaft T independent of each other.

Y is an endless chain, which passes around the pulley X and around a pulley, Z, attached to the journal of the roller $a$, so that the seed-distributing apparatus will be operated from the said roller $a$. The journals of the roller $a$ revolve in bearings attached to the rear part of the side bars of the frame A, so that the said roller will cover the seed and will press down and smooth the top of the row.

The rear part of the seed-cup K is cut away, and the opening thus formed is closed by the cut-off slide b, the edges of which slide upon the adjacent parts of the said seed-cup K, so that the slide b can be adjusted to keep its inner edge against the inner surface of the disk Q as the said disk is moved in and out, to leave a shorter or longer part of the ribs or buckets P exposed, according as less or more seed is to be carried out by the said buckets. The buckets P carry the seed out beneath the lower part of the inner end of the cut-off slide b and allow it to drop into the hollow shank of the foot H.

Upon the outer end of the cut-off slide b is formed a forked upwardly-projecting arm or flange, c, to receive the shaft T, so that the said cut-off slide will be retained in place by the retaining-collar V.

To the upper part of the inner end of the cut-off slide b is attached a rubber block, d, to close the space between the said cut-off slide and the inner surface of the distributing-wheel N, through which the buckets P pass.

In a recess in the seed-cup K, below the cut-off slide b, is placed a gage-slide, e, which, when pushed inward toward the disk Q, gages the size of the discharge-opening, and thus adapts the machine to be used for planting larger and smaller seed without changing any parts of the machine. The gage-slide e and the part of the seed-cup K beneath it are slotted longitudinally to receive the set-screw f, which passes through the said slots and into a screw-hole in the cut-off slide b, so as to clamp the gage-slide e in any position into which it may be adjusted.

Upon the outer end of the gage-slide e is formed a downwardly-projecting arm, g, to serve as a handle for convenience in adjusting the said slide.

Having thus described my invention, what I claim as new, and desire to secure by Letters Patent, is—

1. The combination, with the cut-off slide b and seed-cup K, of a gage-slide, e, arranged in a recess of the cup and below the slide, as shown and described.

2. The combination, with the disk Q and slotted seed-cup K, having a recess below the cut-off slide b, of the handle, slotted gage slide e, and the screw f, working through cup and gage-slide into slide b, as described, to adapt the machine to drill seeds of different sizes and kinds.

JOHN BARTLETT.

Witnesses:
   JOHN S. SARKE,
   PHIL. H. GIBBS.